(12) United States Patent
Del Re et al.

(10) Patent No.: US 6,325,338 B1
(45) Date of Patent: Dec. 4, 2001

(54) BRIDLE RING SADDLE

(75) Inventors: James Del Re, Hanover Park; William Jannusch, Crystal Lake; Vincent Scottelaro, Belvidere, all of IL (US)

(73) Assignee: Minerallac Company, Addison, IL (US)

( * ) Notice: Subject to any disclaimer, the term of this patent is extended or adjusted under 35 U.S.C. 154(b) by 0 days.

(21) Appl. No.: 09/366,884

(22) Filed: Aug. 4, 1999

(51) Int. Cl.⁷ .................................................... F16L 3/22
(52) U.S. Cl. ........................................... 248/69; 248/68.1
(58) Field of Search ................................. 248/69, 49, 58, 248/62, 68.1, 73, 74.1, 74.2

(56) References Cited

U.S. PATENT DOCUMENTS

| | | |
|---|---|---|
| D. 289,138 | 4/1987 | Nead . |
| 419,642 | 1/1890 | Cornog . |
| 622,778 | 4/1899 | Nordyke . |
| 661,604 | 11/1900 | Grabler . |
| 887,272 | 5/1908 | Robinson . |
| 1,344,514 | 6/1920 | Lessells . |
| 1,830,438 | 11/1931 | Miller . |
| 2,285,632 | 6/1942 | Urbain . |
| 2,350,290 | 5/1944 | Moore . |
| 2,515,603 | 7/1950 | Kaplan . |
| 2,862,368 | 12/1958 | Dempsey . |
| 2,891,752 | 6/1959 | Genter . |
| 2,923,508 | 2/1960 | Daugherty . |
| 3,136,515 | 6/1964 | Potruch . |
| 3,141,643 | 7/1964 | Shrewsbury . |
| 3,154,279 | 10/1964 | Fletcher . |
| 3,185,758 | 5/1965 | Litz . |
| 3,485,467 | 12/1969 | Fuchs . |
| 3,532,312 | 10/1970 | Kopf . |
| 3,556,447 | 1/1971 | Jenkins . |
| 3,620,490 | 11/1971 | Robert . |
| 3,923,277 | 12/1975 | Parrault . |
| 4,039,131 | 8/1977 | Perrault . |
| 4,146,203 | 3/1979 | Williams . |
| 4,209,155 | 6/1980 | Florian . |
| 4,338,707 | 7/1982 | Byerly . |
| 4,407,478 | 10/1983 | Hodges . |
| 4,650,144 | 3/1987 | Conrad . |

(List continued on next page.)

FOREIGN PATENT DOCUMENTS

| | | |
|---|---|---|
| 683324 | 11/1995 | (EP) . |
| 1042814 | 9/1966 | (GB) . |

OTHER PUBLICATIONS

Introducting Cable Hook System from B–Line, 1998, B–Line Systems Inc.

There's Only One King in this Jungle, May, 1997, Erico, Inc.

Minerallac Spring Steel Fasterners Catologue, p. 25, Jul., 1996, Minerallac Company.

Caddy Installation Instructions for WMX–6, 1985, Erico Products, Inc.

Caddy Fasterns Newsletter, No. 225, 1990, Erico Products, Inc.

Caddy Fasteners Newsletter, No. 230, 1990, Erico Products, Inc.

Caddy Fasteners Newsletter, No. 238, Feb. 1991,Erico Products, Inc.

*Primary Examiner*—Anita King
(74) *Attorney, Agent, or Firm*—Cook, Alex, McFarron, Manzo, Cummings & Mehler, Ltd.

(57) ABSTRACT

A cable support and method for retrofitting a bridle ring are provided. The support includes a relatively thin truncated generally cylindrical member or saddle having a plurality of receptor clips positioned around the outside surface thereof. The diameter of the saddle and associated receptors are such that the saddle provides a wide-based support for communication cables and the like such that a plurality of such cables may be positioned therein without jeopardizing the integrity of the system for which they serve.

22 Claims, 1 Drawing Sheet

U.S. PATENT DOCUMENTS

| | | |
|---|---|---|
| 4,700,917 | 10/1987 | Dillman . |
| 4,709,888 | 12/1987 | Lansdale . |
| 5,014,940 * | 5/1991 | Sherman .............................. 248/74.1 |
| 5,092,546 | 3/1992 | Wolfbauer . |
| 5,135,187 | 8/1992 | Joas . |
| 5,192,039 | 3/1993 | Williams . |
| 5,205,523 | 4/1993 | Jones . |
| 5,385,320 | 1/1995 | Ismert . |
| 5,427,338 | 6/1995 | Garrett . |
| 5,503,334 | 4/1996 | Pacht . |
| 5,509,632 | 4/1996 | Mesna . |
| 5,542,631 | 8/1996 | Bruno . |
| 5,564,658 | 10/1996 | Rinderer . |
| 5,618,014 | 4/1997 | Rinderer . |
| 5,740,994 | 4/1998 | Laughlin . |
| 6,131,617 * | 10/2000 | Pitzer et al. .......................... 138/143 |

* cited by examiner

BRIDLE RING SADDLE

BACKGROUND OF THE INVENTION

The present invention relates generally to a cable support and method, and more particularly to a saddle to be used to retrofit a bridle ring and a method thereof.

The exponential growth of the computer and communication industries has created a problem with the installation and management of the required cables thereof. In the past, the installation of communication lines typically included the so-called twisted pair telephone lines and nothing more. These types of lines are very strong and versatile and can be installed by almost any means without affecting the performance of the equipment they serve. However, modern telecommunications cable is increasingly becoming more sensitive and therefore the cable support needs to properly hold the cable without placing stress thereon or otherwise compromising same.

For example, the cable most widely used at the time of this writing for all high-speed telecommunications systems is the so-called Category 5 copper cable (UTP). This Category 5 cable consists of four tightly twisted pairs of insulated copper wires enclosed within a jacket. Proper installation of Category 5 is crucial to the overall success of its associated telecommunications system. The improper installation thereof, including crimped cables or a tight bend radius will jeopardize the integrity of the data being communicated and degrade performance.

This jeopardy may take the form of cross-talk, attenuation, data distortion, return loss, and background noise, all of which affect signal strength in one form or another. Thus, during installation, the cable should not be kinked, snaked, bent sharply, tugged, sag excessively, come into engagement with sharp edges, or be too close to power cables. Therefore, perhaps the most important aspect of any telecommunications cabling installation project is providing the proper support for the cable.

Typical cable supports include conduits, trays, racks, wire pathways, rings, hooks and fasteners. Most data cabling from the telecommunications closet to the work area is suspended from the coiling by one or more of these types of supports. Usually, heavy duty or modular tray systems are used to run the large bundles as they branch off from the telecommunications closet. These trays can be attached to a beam, purlin or deck and although are the more costly support method, are the most effective. They provide consistent support throughout the length of the cable, as opposed to products that provide intermittent support every few feet. However, as the bundles of cable get smaller the further away from the closet, the use of trays become less efficient. Additionally, some structures prohibit the use of such trays in the ceiling. Thus the need for rings, hooks and tie fasteners.

Without the use of trays, the routing of cable through the ceiling is a more difficult task for installers. Not only are installers concerned with keeping cables from sagging, but they need to keep them off of the ceiling tiles to prevent damage in the event access is needed above the tiles. In particular, it is conventional practice to allow at least three inches above the ceiling grid to facilitate the lifting of the tile for access therein. One of the most popular methods of providing such cable support is through the use of bridle rings. When used in conjunction with other fasteners, the bridle ring can be located in virtually any structure in a building. As a separate cable support, these rings lend themselves to providing a customized pathway as opposed to the rigid structural limitations imposed upon the use of trays.

In particular, a bridle ring is a ring of typically a one to four inch diameter with a suspension rod threaded end (optional) and an opening. The threaded end may be of the machine thread metal type to be used in conjunction with other fasteners and attached to steel beams or posts, or it may be of the woodscrew type for use with wood beams. In any event, the bridle ring is suspended, typically from a ceiling or a ceiling fixture, with the threaded end and the opening being oriented upwardly. A wire, cable or the like is suspended by means of the bridle ring, with the wire or cable being slid through the opening on the bridle ring. Thus, these rings are easy to install, require no tools or ties, can accommodate various runs of bundled cables and are ideal for communication applications utilizing relatively nonsensitive cables.

However, as these rings have a narrow base support for the cable, they may adversely affect the performance of other higher communication cables. In particular, this narrow base causes the cable to bend, crimp or snag at the ring base, which in turn causes transmission distortion. With each cable added to the bundle, those underneath are more susceptible to kinkage due to the added pressure of the weight of those above. Thus the key for many installers is to avoid placing any pressure, or stress points on the cable.

In light of the preceding problems, there has been an effort in the art to develop a support structure that does not affect the performance of higher communication cables. For example, U.S. Pat. No. 5,740,994, issued Apr. 21, 1998, describes a cable support and method. The support thereof is in the form of a saddle with a wide flat center section to support cable in a lay-in fashion. More particularly, the support is in the form of a J-hook with the interior surface of the crook of the 'J' forming a saddle including a smooth flat center surface having lateral edges or stiffening flanges which extend from the flat center at an obtuse angle. Although, this J-hook configuration provides a larger support surface than other prior devices, due to the dramatic shift from a flat surface to the edge flanges and the run and weight of the cable, they still place pressure and stress on the cable thereby jeopardizing its integrity. Additionally, the stem of the J-hook cannot be attached to the support structures within the ceiling as uniformly and readily as the conventional bridle ring.

Accordingly, there is a need for a bridle ring retrofit cable support for the installation of cable lines, particularly in the suspended ceiling and grid-work of a subject building, and which can be fastened to or supported directly or indirectly from anything encountered. Therefore, it is a general object of the present invention to provide such a retrofit device.

It is another object of the present invention to provide a support for communication cable such as fiber optic cable and the like.

It is another object of the present invention to provide a support hanger for wire, cables and the like that is readily mounted and will receive a plurality of wires, cables and the like with ease arid support same in a neat, compact manner.

It is another object of the present invention to provide a resilient and strong retrofit cable support.

Yet another object of the present invention is to provide a retrofit cable support that is simple in its construction and easy to mount upon existing bridle rings.

Still another object of the present invention is to provide a cable support which does not jeopardize the integrity of the system which it serves.

These and other objects, features and advantages of the present invention will be clearly understood through a consideration of the following detailed description.

SUMMARY OF THE INVENTION

According to the present invention, there is provided a cable support to be used in conjunction with a bridle ring, as well as a system incorporating the cable support and bridle ring in combination. The cable support is a truncated generally cylindrical member dimensioned to be closely received by the bridle ring when positioned therein and having an inside surface and an outside surface. The inside surface is arcuate in cross-section and provides for a constant arc wide-based support for the cable while the outside surface includes an arrangement for receiving the bridle ring and stabilizing the truncated generally cylindrical member thereon.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
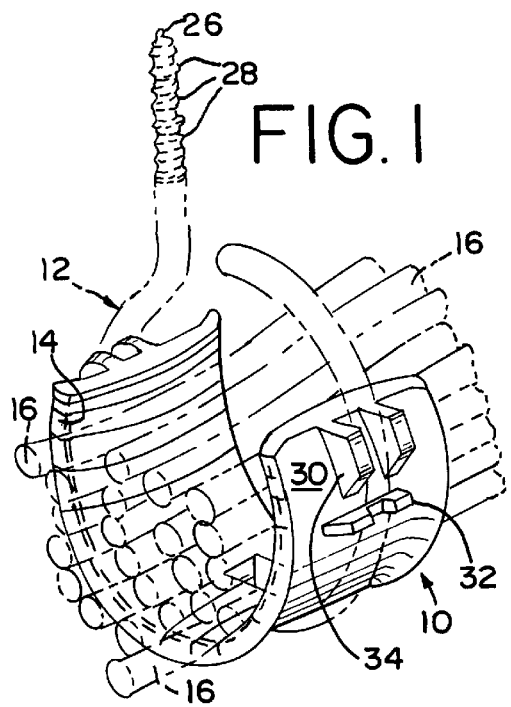
FIG. 1 is a perspective view of a preferred embodiment of the bridle ring saddle constructed in accordance with the principles of the present invention showing both the bridle ring and the supported cables in phantom.

Referring to the Figures, and particularly to FIG. 1, a saddle 10 constructed in accordance with the principles of the present invention is shown positioned within bridle ring 12. Saddle 10 may be of any color, but the preferred color of this embodiment is yellow to aid in the identification of cable runs in dark and cramped areas. This saddle includes an inside surface 14 by which a plurality of cables 16 may be supported. Cable 16 may be any form of communication line, including, for example, voice, data, Category 3, Category 4, Category 5, fiber optic and the like.

It is preferred that the saddle be constructed of a molded polymer. A convenient approach in this regard is to injection mold the saddle of a self-supportive polymer. Such a polymer will provide surface characteristics which are especially suitable for the type of contact with the cables which is typical for the applications noted herein. Having a polymeric surface as opposed to a more conventional metallic surface avoids metal edges which could tear or damage cable or its sheathing. This polymeric material may be of any thermoplastic resin or other like materials that can be molded or shaped, such as, for example, polypropylene, polyethylene, nylons, hard rubbers, fiberglass, and the like. Coloring with, for example, safety colors also is facilitated by using a polymeric material.

Figure 2:
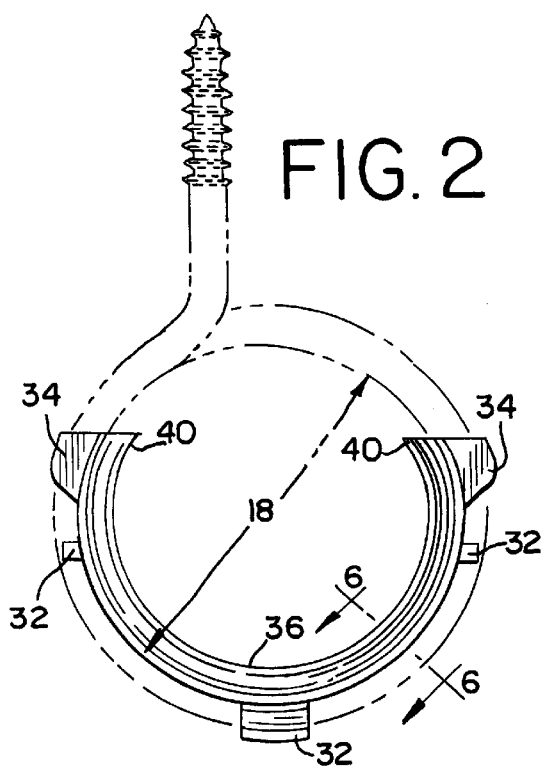
FIG. 2 is a front elevational view of the saddle of FIG. 1 showing the bridle ring in phantom.
Figure 3:
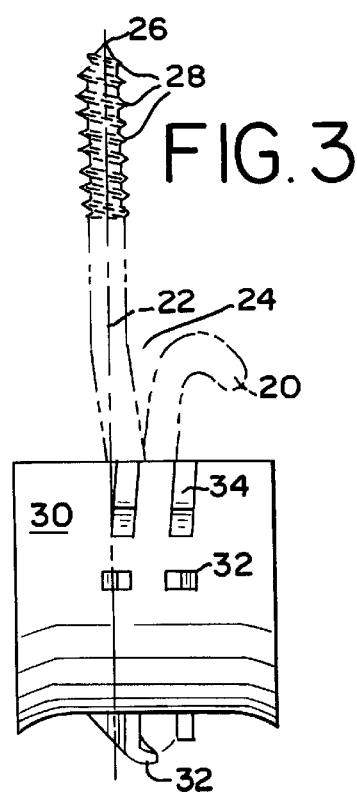
FIG. 3 is a side elevational view of the saddle of FIG. 1 showing the bridle ring in phantom.
Figure 4:
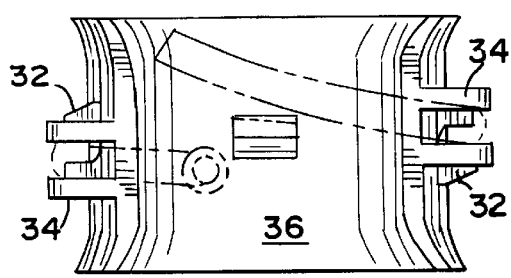
FIG. 4 is a top plan view of the saddle of FIG. 1 showing the bridle ring in phantom.
Figure 5:
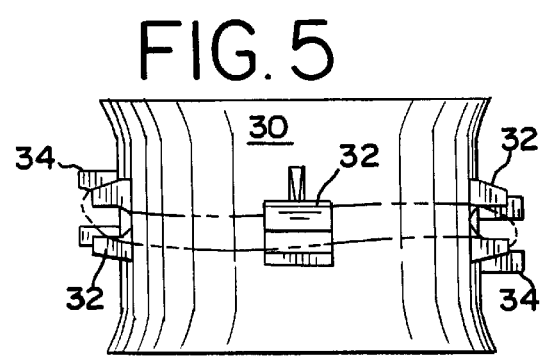
FIG. 5 is a bottom plan view of the saddle of FIG. 1 showing the bridle ring in phantom.

Bridle ring 12 may be made preferably of a zinc plated steel, but any strong and rigid material such as most alloys or the like would suffice. These rings typically have diameters 18 (FIG. 2) of one to four inches, but it will be understood that they are not limited thereto. The illustrated bridle ring 12 does not form a closed ring per se. In the conventional bridle ring shown, one end 20 gradually extends away from the ring centerline 22 to provide for an opening 24 near its top (see FIG. 3). This opening enables the cables 16 to be passed therethrough and rest on the bottom of the ring. It will be appreciated that other opening arrangements could be provided. In any event, the use of the bridle ring structure avoids the need for any additional retaining devices such as cable ties or tie wraps. Cables will not "jump" out of the support during or after installation.

The other end 26 of the ring 12 may include threads 28 to facilitate the mounting of the ring upon the structures within a ceiling and the like. Threads 28 illustrated in the Figures are shown as woodscrew threads; however, machine screw threads in combination with bolts may be used. The latter may he used with other mounting aids such as stud clips, t-bar clips, beam clips and the like. In any event, the bridle ring 12 is an extremely versatile cable support as it provides a tight secure fit on most any ceiling structure such as flanges, conduits, channels, studs, t-bars and the like.

The retrofit device or saddle 10 of the preferred embodiment is positioned within this conventional bridle ring 12 to allow the handling of cable 16 therein without kinking, bending or crimping thereof. In general, the saddle 10 rests within the bridle ring 12, and the various types of cables 16 are not tightly held by the saddle 10, but the saddle instead provides a generally passive support function therefor.

More particularly, the saddle 10 is a relatively thin truncated generally cylindrical member, preferably an injection molded semi-rigid plastic polymer, having a plurality of receptor clips positioned around the outside surface 30 thereof to stabilize the saddle within the ring. The receptor clips of the preferred embodiment include three positive snaps 32 and two directional pull stabilizers 34. More particularly, the three positive snaps of the preferred embodiment include a bottom swivel-snap 32a, along with its supportive rib or fin 33, and two side pulling or positioning snaps 32b. These clips provide for a snap-on design that resists being pulled off the bridle ring during cable installation. In a typical use, the swivel-snap 32a first is installed onto the bridal ring while the saddle 10 is outside the bridal ring, after which the saddle 10 can be rotated or swung on and into the bridal ring.

The diameter of this truncated generally cylindrical member and the size and shape of the receptor clips are such that the saddle tits snugly within and closely receives the bridle ring 12. it will be understood that a partial or complete channel or the like as well as other methods may be employed about the outside surface 30 of the saddle 10 instead of the receptor clips of the illustrated embodiment in order to hold the saddle 10 firmly within the ring 12.

The support surface 36 of the saddle provides for a wide-based support for the cables and includes an outwardly sloping arch to further allow the cable to lay smoothly, without crimping or cutting. In the illustrated preferred embodiment, the entire support surface 36 of the saddle 10 has a transverse cross-section which follows a gradual, constant arc of a given radius, typically between about 2 and 10 inches (about 5 and 25 cm). More particularly, the degree of pitch of this arch is close to the natural lay of the cable when the hooks are installed several feet apart as usual for a typical installation. Such outwardly sloping arch avoids any ridges and/or hollows that occur were the support surface to be flat such as that provided by a right cylinder, even if such a flat surface were to be flanked by separate flanges. Thus, the arch provides for full support of the run of cable as the wide radius provides for the maximum surface contact supporting the cable. As this support surface 36 is replacing the bottom of the ring as the cable support, all of the aforementioned problems with the cables being supported directly by rings are eliminated.

Figure 6:
FIG. 6 is a cross-sectional view of the illustrated saddle, taken along line 6—6 of FIG. 2.

It will be appreciated that the constant radius support surface 36 can have remote edges or ends 38 (FIG. 6). A rounded edge is thus provided in the form of a tight arc having a relatively short radius of between about 0.1 and about 0.6 inches (about 0.25 and 1.5 cm).

In view of its retrofit attributes, the saddle 10 may be utilized to upgrade an existing bridle ring installed vertically or horizontally mounted cable framework. The user simply inserts the saddle 10 into an existing, installed bridle ring and snaps it into place. Of course, they also are used during the initial organization and installation of a bridle ring framework.

With further reference to the retrofit approach in the preferred embodiment, the existing supported cables are temporarily removed from the bridle ring through opening 24 and supported by either the installer's free hand or other support. The bottom of the saddle is snapped onto the bridle ring via swivel snap 32*a,* and rotated into alignment with the ring. Saddle 10 is then squeezed so that its ends 40 are forced towards each other and positioned within the ring such that the positioning snaps 32*b* hold the saddle firmly in place when the saddle is released and the ends 40 return to their starting position. Now the previously removed cable is once again passed through the opening 24 to rest upon the support surface 36. In the case of initial installation, the saddle may be positioned within the ring (as described) either before or after the bridle ring is attached to the ceiling support structure.

Thus, as described, there is provided a retrofitting cable support to be used with current bridle rings, which makes such cable easier to install and costs less than trays and the like. Because the saddle of the present invention uses such bridle rings, it is ideal for any structures present in the ceiling in which installation is needed. With the present invention, cable can simply be bundled and laid or pulled without kinking bending or crimping. The invention provides superior support for low voltage, data and telephone cables which presents transmission rate degradation or distortion due to cable stress, kinking, excessive bending or sagging. Such support provides maximum surface contact support of the cables and allows easy pull-through or lay-in of cables. The assemblies are easily positioned in any direction for efficient cable usage.

While a particular embodiment of the invention has been shown and described, it will be obvious to those skilled in the art that changes and modifications may be made therein without departing from the invention in its broader aspects and, therefore, the aim in the appended claims is to cover all such changes and modifications as fall within the true spirit and scope of the invention.

What is claimed is:

1. A cable support adapted to be used with a bridle ring, comprising:
   a truncated generally cylindrical member having an inside surface and an outside surface, said member being dimensioned such that said member is closely received by said ring when positioned therein;
   said inside surface having an outwardly sloping continuous arch of a first radius providing a widebased arcuate support for said cable; and
   said outside surface having a receptor including a receptor clips which receives a bridle ring for stabilizing said member thereon.

2. The cable support as defined in claim 1 wherein said member is comprised of a semi-rigid material.

3. The cable support as defined in claim 2 wherein said semi-rigid material is a molded polymer.

4. The cable support as defined in claim 1 wherein said clips include a swivel snap and a positioning snap.

5. The cable support as defined in claim 1 wherein said first radius is between about 5 and 25 cm.

6. The cable support as defined in claim 1 wherein said inside surface further includes remote ends of a second radius, said second radius being less than said first radius.

7. The cable support as defined in claim 6 wherein said second radius is between about 0.25 and 1.5 cm.

8. The cable support as defined in claim 1 wherein said member is of a safety color.

9. A cable support system comprising:
   a generally ring shaped support member having two ends and an opening, one of said ends adaptable for attaching said support member to a support structure;
   a truncated generally cylindrical member having an inside surface and an outside surface, said truncated generally cylindrical member being dimensioned such that said truncated generally cylindrical member is closely received by said support member when positioned therein;
   said inside surface having an outwardly sloping continuous arch of a first radius providing a widebased arcuate support for said cable; and
   said outside surface having a receptor including a plurality of receptor clips which receives said support member for stabilizing said truncated generally cylindrical member thereon.

10. The cable support system as defined in claim 9 wherein the end adaptable for attaching said support member to a support structure includes threads.

11. The cable support system as defined in claim 9 wherein said truncated generally cylindrical member is comprised of a semi-rigid material which is a molded polymer.

12. The cable support system as defined in claim 9 wherein said receptor clips include a swivel snap and a positioning snap.

13. The cable support system as defined in claim 9 wherein said first radius is between about 5 and 25 cm.

14. The cable support system as defined in claim 9 wherein said inside surface further includes remote ends of a second radius, said second radius being less than said first radius.

15. The cable support system as defined in claim 14 wherein said second radius is between about 0.25 and 1.5 cm.

16. The cable support system as defined in claim 9 wherein said truncated generally cylindrical member is of a safety color.

17. A cable support system comprising:
   a generally ring shaped support member having two ends and an opening, one of said ends adaptable for attaching said support member to a support structure;
   a truncated generally cylingdrical member having an inside surface and an outside surface, said truncated generally cylindrical member being dimensioned such that said truncated generally cylindrical member is closely received by said support member when positioned therein;

said inside surface having a substantially continuous surface providing a wide-based arcuate support for a cable; and said outside surface having a receptor including a plurality of receptor clips which receives said support member for stabilizing said truncated generally cylindrical member thereon.

18. The cable support system as defined in claim 17 wherein the end adaptable for attaching said support member to a support structure includes threads.

19. The cable support system as defined in claim 17 wherein said truncated generally cylindrical member is comprised of a semi-rigid material which is a molded polymer.

20. The cable support system as defined in claim 17 wherein said receptor clips include a swivel snap and a positioning snap.

21. A method of supporting a run of cable, comprising the steps of:

providing spaced bridle rings;

positioning a truncated generally cylindrical member within each of said rings, said truncated generally cylindrical member having an inside surface which is substantially continuous to provide a wide-based support for said cable and an outside surface having a receptor which receives said ring, said member being dimensioned such that said member is closely received by said ring when positioned therein;

suspending the run of cable from wide-based support to wide-based support;

spacing the rings along the cable run such that said cable run has a natural sag between truncated generally cylindrical members;

snapping a bottom swivel receptor of the truncated generally cylindrical member onto said ring;

rotating the truncated generally cylindrical member into alignment with said ring, and squeezing the ends of said member towards each other to position said member within said ring; and snapping a positioning snap of the truncated generally cylindrical member onto said ring.

22. The method of claim 21 wherein said positioning step includes providing an inside surface of the member which is an outwardly sloping continuous arch, and said suspending step includes having the arch substantially correspond to the natural sag of the cable.

* * * * *

UNITED STATES PATENT AND TRADEMARK OFFICE
CERTIFICATE OF CORRECTION

PATENT NO. : 6,325,338 B1  
DATED : December 4, 2001  
INVENTOR(S) : Del Re et al.

Page 1 of 2

It is certified that error appears in the above-identified patent and that said Letters Patent is hereby corrected as shown below:

Column 1,  
Lines 20, 21 and 23, delete "5" and insert -- 5 --.  
Line 40, delete "coiling" and insert -- ceiling --.  
Line 44, after "although" insert -- they --.  
Line 45, after "method," insert -- they --.

Column 2,  
Line 24, after "pressure" delete ",".  
Line 56, delete "arid" and insert -- and --.

Column 3,  
Line 50, delete "3" and insert -- 3 --.  
Line 51, delete "4" and insert -- 4 --.  
Line 51, delete "5" and insert -- 5 --.

Column 4,  
Line 19, delete "he" and insert -- be --.  
Line 49, delete "tits" and insert -- fits --.  
Line 50, delete "it" and insert -- It --.

Column 5,  
Line 44, after "kinking" insert -- , --.  
Line 66, delete "widebased" and insert -- wide-based --.  
Line 67, delete "said" and insert -- a --.

UNITED STATES PATENT AND TRADEMARK OFFICE
CERTIFICATE OF CORRECTION

PATENT NO. : 6,325,338 B1
DATED : December 4, 2001
INVENTOR(S) : Del Re et al.

It is certified that error appears in the above-identified patent and that said Letters Patent is hereby corrected as shown below:

<u>Column 6,</u>
Line 1, after "including a" insert -- plurality of --.
Line 30, delete "widebased" and insert -- wide-based --.
Line 31, delete "said" and insert -- a --.
Line 62, delete "cylingdrical" and insert -- cylindrical --.

Signed and Sealed this

Sixteenth Day of April, 2002

Attest:

JAMES E. ROGAN
*Attesting Officer*  *Director of the United States Patent and Trademark Office*